(12) United States Patent
Park et al.

(10) Patent No.: US 12,124,128 B2
(45) Date of Patent: Oct. 22, 2024

(54) DISPLAY APPARATUS AND LIGHT SOURCE DEVICE

(71) Applicant: SAMSUNG ELECTRONICS CO., LTD., Suwon-si (KR)

(72) Inventors: Chunsoon Park, Suwon-si (KR); Hyungsuk Kim, Suwon-si (KR); Sungyeol Kim, Suwon-si (KR); Taeyeon Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 18/213,623

(22) Filed: Jun. 23, 2023

(65) Prior Publication Data
US 2024/0069379 A1 Feb. 29, 2024

Related U.S. Application Data

(63) Continuation of application No. PCT/KR2023/007497, filed on Jun. 1, 2023.

(30) Foreign Application Priority Data

Aug. 24, 2022 (KR) .................. 10-2022-0106283

(51) Int. Cl.
*G02F 1/133* (2006.01)
*G02F 1/1335* (2006.01)
*G02F 1/13357* (2006.01)

(52) U.S. Cl.
CPC .. *G02F 1/133606* (2013.01); *G02F 1/133603* (2013.01); *G02F 1/133605* (2013.01); *G02F 1/133611* (2013.01); *G02F 1/133614* (2021.01)

(58) Field of Classification Search
CPC ......... G02F 1/133603; G02F 1/133605; G02F 1/133606; G02F 1/133611; G02F 1/133614
See application file for complete search history.

(56) References Cited

U.S. PATENT DOCUMENTS

| 7,324,174 | B2 | 1/2008 | Hafuka et al. |
| 10,355,181 | B2 | 7/2019 | Yamada |

(Continued)

FOREIGN PATENT DOCUMENTS

| JP | 3198519 U | 7/2015 |
| KR | 10-2007-0034751 A | 3/2007 |

(Continued)

OTHER PUBLICATIONS

International Search Report and Written Opinion (PCT/ISA/210 and PCT/ISA/237) dated Sep. 21, 2023, issued by International Searching Authority in International Application No. PCT/KR2023/007497.

*Primary Examiner* — Paisley L Wilson
(74) *Attorney, Agent, or Firm* — Sughrue Mion, PLLC

(57) ABSTRACT

A light source device includes a substrate, a reflective sheet on the substrate and including a through hole, a light source on the substrate, and exposed through the through hole of the reflective sheet, the light source including a light emitting diode (LED), and a quantum dot sheet configured to convert a color of light emitted from the light source, where the substrate includes a diffuse reflection layer exposed through the through hole of the reflective sheet and configured to diffusely reflect light emitted from the light source and light reflected from the quantum dot sheet.

20 Claims, 13 Drawing Sheets

(56) References Cited

U.S. PATENT DOCUMENTS

| | | | |
|---|---|---|---|
| 10,899,105 B2 | 1/2021 | Dubrow et al. | |
| 11,353,740 B2 | 6/2022 | Lee et al. | |
| 2017/0017121 A1* | 1/2017 | Park | G02F 1/133609 |
| 2020/0285114 A1* | 9/2020 | Yamashita | G02F 1/133606 |

FOREIGN PATENT DOCUMENTS

| | | |
|---|---|---|
| KR | 10-2012-0050720 A | 5/2012 |
| KR | 10-2012-0069045 A | 6/2012 |
| KR | 10-1161465 B1 | 7/2012 |
| KR | 10-1779239 B1 | 9/2017 |
| KR | 10-1868536 B1 | 6/2018 |
| KR | 10-2018-0132370 A | 12/2018 |
| KR | 10-2019-0010478 A | 1/2019 |
| KR | 10-2019-0017264 A | 2/2019 |
| KR | 10-1985148 B1 | 5/2019 |
| KR | 10-2021-0059408 A | 5/2021 |
| KR | 10-2021-0101369 A | 8/2021 |
| KR | 10-2022-0020116 A | 2/2022 |
| KR | 10-2022-0099072 A | 7/2022 |

\* cited by examiner

DISPLAY APPARATUS AND LIGHT SOURCE DEVICE

CROSS-REFERENCE TO RELATED APPLICATIONS

This application is a continuation of International Application No. PCT/KR2023/007497, filed on Jun. 1, 2023, in the Korean Intellectual Property Receiving Office, which is based on and claims priority to Korean Patent Application No. 10-2022-0106283, filed on Aug. 24, 2022, in the Korean Intellectual Property Office, the disclosures of which are incorporated herein by reference in their entireties.

BACKGROUND

1. Field

The disclosure relates to a display apparatus and light source device having an enhanced optical structure.

2. Description of Related Art

In general, display apparatuses are a type of output devices for displaying obtained or stored electrical information for the user by converting the electrical information to visual information, and are used in various fields such as homes or work places.

There are many different display apparatuses such as monitor devices connected to personal computers (PCs) or server computers, portable computer systems, Global Positioning System (GPS) terminals, general television sets, Internet protocol televisions (IPTVs), portable terminals (e.g., smart phones, tablet PCs, personal digital assistants (PDAs), cellular phones, etc.), as well as any other display device for reproducing images like advertisements or films, or other various kinds of audio/video systems.

The display apparatus may include a light source module to convert electrical information to visual information, and the light source module may include a plurality of light sources to separately emit light. Each of the plurality of light sources may include, for example, a light emitting diode (LED) or an organic LED (OLED). For example, the LED or the OLED may be mounted on a circuit board or a substrate.

SUMMARY

The disclosure provides a display apparatus and light source device having an optical structure that may enhance uniformity of blue light.

According to an aspect of the disclosure, a light source device may include a substrate, a reflective sheet on the substrate and including a through hole, a light source on the substrate, and exposed through the through hole of the reflective sheet, the light source including a light emitting diode (LED), and a quantum dot sheet configured to convert a color of light emitted from the light source, where the substrate may include a diffuse reflection layer exposed through the through hole of the reflective sheet and configured to diffusely reflect light emitted from the light source and light reflected from the quantum dot sheet.

The diffuse reflection layer may include at least one first bump in a portion of an area exposed through the through hole.

The light source further may include an optical dome at least partially covering the LED and at a distance from the reflective sheet, and the at least one first bump may be in a first area on the diffuse reflection layer located within the optical dome.

The diffuse reflection layer may include at least one second bump is in a second area on the diffuse reflection layer located between the optical dome and the reflective sheet.

A first amount of the at least one first bump in the first area may be higher than a second amount of the at least one second bump in the second area.

The at least one first bump may protrude from a rear surface of the diffuse reflection layer at a first height that is lower than a second height of the LED.

The at least one first bump may have a shape of a semi-sphere, a cone, a triangular pyramid or a quadrangular pyramid.

The diffuse reflection layer may be formed by ink include a plurality of beads that is applied on a conductive layer of the substrate.

The diffuse reflection layer may include a cover layer on a conductive layer of the substrate and a bump pattern on the cover layer.

According to an aspect of the disclosure, a display apparatus may include a liquid crystal panel and a light source device configured to emit light to the liquid crystal panel, where the light source device may include a substrate, a reflective sheet on the substrate and including a through hole, a light source on the substrate, and exposed through the through hole of the reflective sheet, the light source including a LED, and a quantum dot sheet configured to convert a color of light emitted from the light source, and where the substrate may include a diffuse reflection layer exposed forward through the through hole of the reflective sheet and configured to diffusely reflect light emitted from the light source and light reflected from the quantum dot sheet.

The diffuse reflection layer may include at least one first bump formed in a portion of an area exposed through the through hole.

The light source may include an optical dome at least partially covering the LED and at a distance from the reflective sheet and the at least one first bump may be in a first area on the diffuse reflection layer located within the optical dome.

The diffuse reflection layer may include at least one second bump is in a second area on the diffuse reflection layer located between the optical dome and the reflective sheet.

A first amount of the at least one first bump in the first area may be higher than a second amount of the at least one second bump in the second area.

The at least one first bump may protrude from a rear surface of the diffuse reflection layer at a first height that is lower than a second height of the LED.

The at least one first bump may have a shape of a semi-sphere, a cone, a triangular pyramid or a quadrangular pyramid.

The diffuse reflection layer may be formed by ink including a plurality of beads that is applied on a conductive layer of the substrate.

The diffuse reflection layer may include a cover layer on a conductive layer of the substrate and a bump pattern on the cover layer.

According to an aspect of the disclosure, a light source device may include a substrate comprising a diffuse reflection layer, a reflective sheet on the substrate and including a through hole, a light source at least partially exposed through the through hole of the reflective sheet, and a quantum dot sheet configured to convert a color of light emitted from the light source, where the diffuse reflection layer may include a first area at least partially exposed through the through hole of the reflective sheet and where the diffuse reflection layer may include at least one first bump in the first area that is at least partially exposed through the through hole of the reflective sheet.

The light source may include an optical dome at least partially covering the first area and the diffuse reflection layer may include at least one second bump in a second area located between the optical dome and the reflective sheet.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
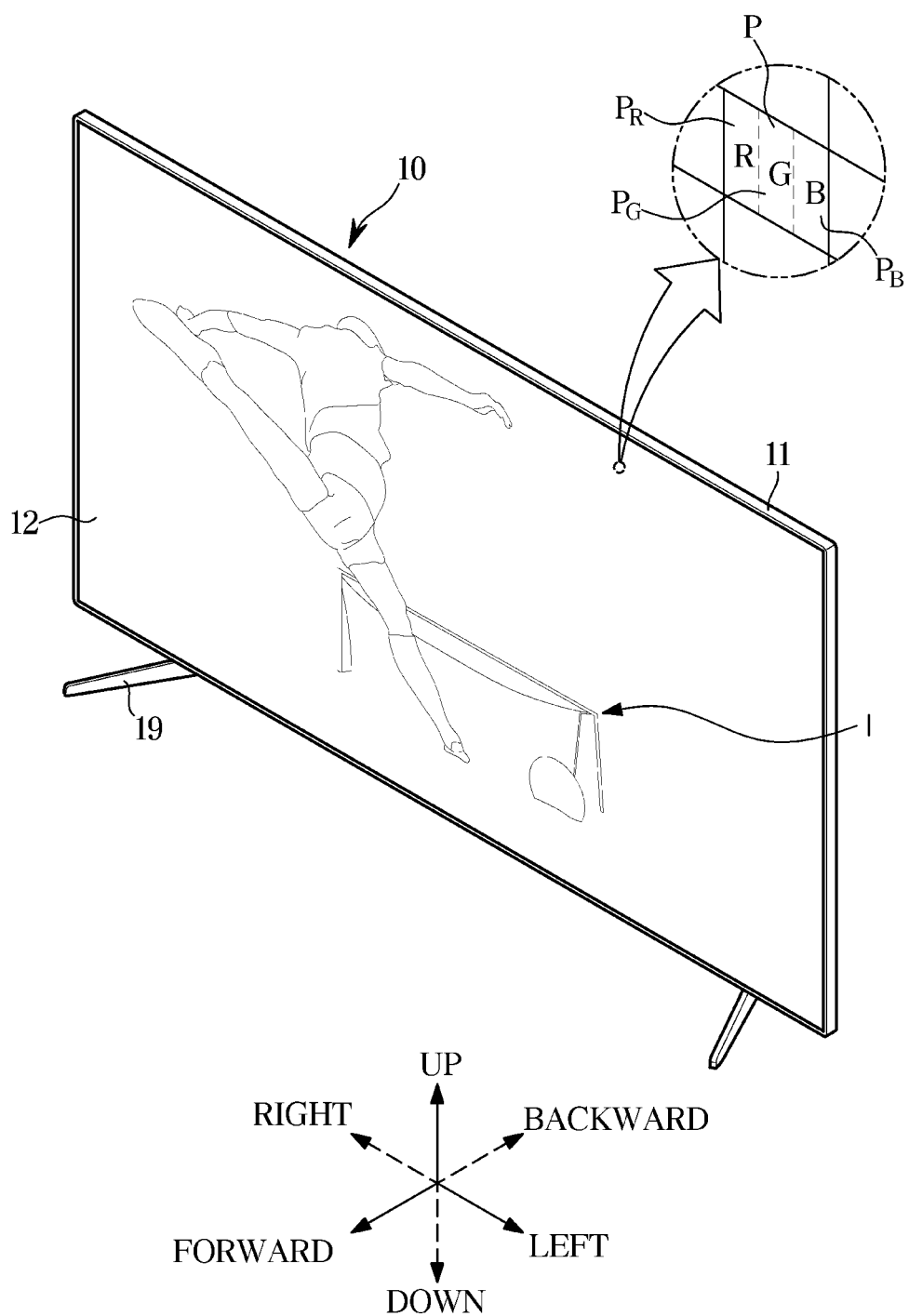
FIG. 1 is an exterior view of a display apparatus, according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms.

Like numerals refer to like elements throughout the specification. Not all elements of embodiments of the disclosure will be described, and description of what are commonly known in the art or what overlap each other in the embodiments may be omitted. The term 'unit, module, member, or block' may refer to what is implemented in software or hardware, and a plurality of units, modules, members, or blocks may be integrated in one component or the unit, module, member, or block may include a plurality of components, depending on the embodiment of the disclosure.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

The principle and embodiments of the disclosure will now be described with reference to accompanying drawings.

FIG. 1 is an exterior view of a display apparatus, according to an embodiment of the disclosure.

A display apparatus 10 is a device that is able to process image signals received from the outside and visually present the processed image. In the following description, the display apparatus 10 is depicted as a television (TV), but embodiments of the disclosure are not limited thereto. For example, the display apparatus 10 may be implemented in various forms, such as a monitor, a portable multimedia device, a portable communication device, and any device capable of visually presenting images, without being limited thereto.

The display apparatus 10 may also be a large format display (LFD) installed outdoors such as on a rooftop of a building or at a bus stop. The term outdoors is not limited to the outside. For example, the display apparatus 10 may be installed indoors such as in a subway station, a shopping mall, a cinema, an office or a shop with high pedestrian traffic.

The display apparatus 10 may receive content data including video data and audio data from various content sources, and output video and audio corresponding to the video data and the audio data. For example, the display apparatus 10 may receive content data through a broadcast receiving antenna or a cable, receive content data from a content reproducing device, or receive content data from a content providing server of a content provider.

Referring to FIG. 1, the display apparatus 10 may include a main body 11, a screen 12 for displaying an image I, and a support 19 arranged under the main body 11 for supporting the main body 11. The main body 11 forms the exterior of the display apparatus 10, and various components for the display apparatus 10 to display the image I or perform many different functions may be arranged in the main body 11. The main body 11 may be illustrated as having the form of a flat plate, but is not limited thereto. For example, the main body 11 may have the form of a curved plate.

The screen 12 may be formed on the front of the main body 11 for displaying the image I. For example, the screen 12 may display still images or moving images. For example, the screen 12 may display two-dimensional (2D) plane images, or three dimensional (3D) stereographic images using parallax of both eyes of the user.

A plurality of pixels P are formed on the screen 12, and the image I displayed on the screen 12 may be formed by the light emitted by each of the plurality of pixels P. For example, the light emitted by the plurality of pixels P may be combined like mosaics into the image I on the screen 12.

The plurality of pixels P may emit light in various colors and brightnesses. For example, each of the plurality of pixels P may include, for example, a self-luminous panel (e.g., a light emitting diode (LED) panel) capable of directly emitting light, or non-luminous panel (e.g., a liquid crystal panel) capable of passing or blocking light emitted from, for example, a light source device.

Each of the plurality of pixels P may include subpixels PR, PG and Pb to emit different colors of light. The subpixels PR, PG, and P B may include a red subpixel PR to emit red light, a green subpixel PG to emit green light, and blue subpixel PB to emit blue light. For example, the red light may have wavelengths of about 620 nanometers (nm, a billionth of a meter) to about 750 nm; green light may have wavelengths of about 495 nm to about 570 nm; blue light may have wavelengths of about 450 nm to about 495 nm. By combinations of the red light of the red subpixel PR, the green light of the green subpixel PG, and the blue light of the blue subpixel PB, each of the pixels P may emit various brightnesses and colors of light.

Figure 2:
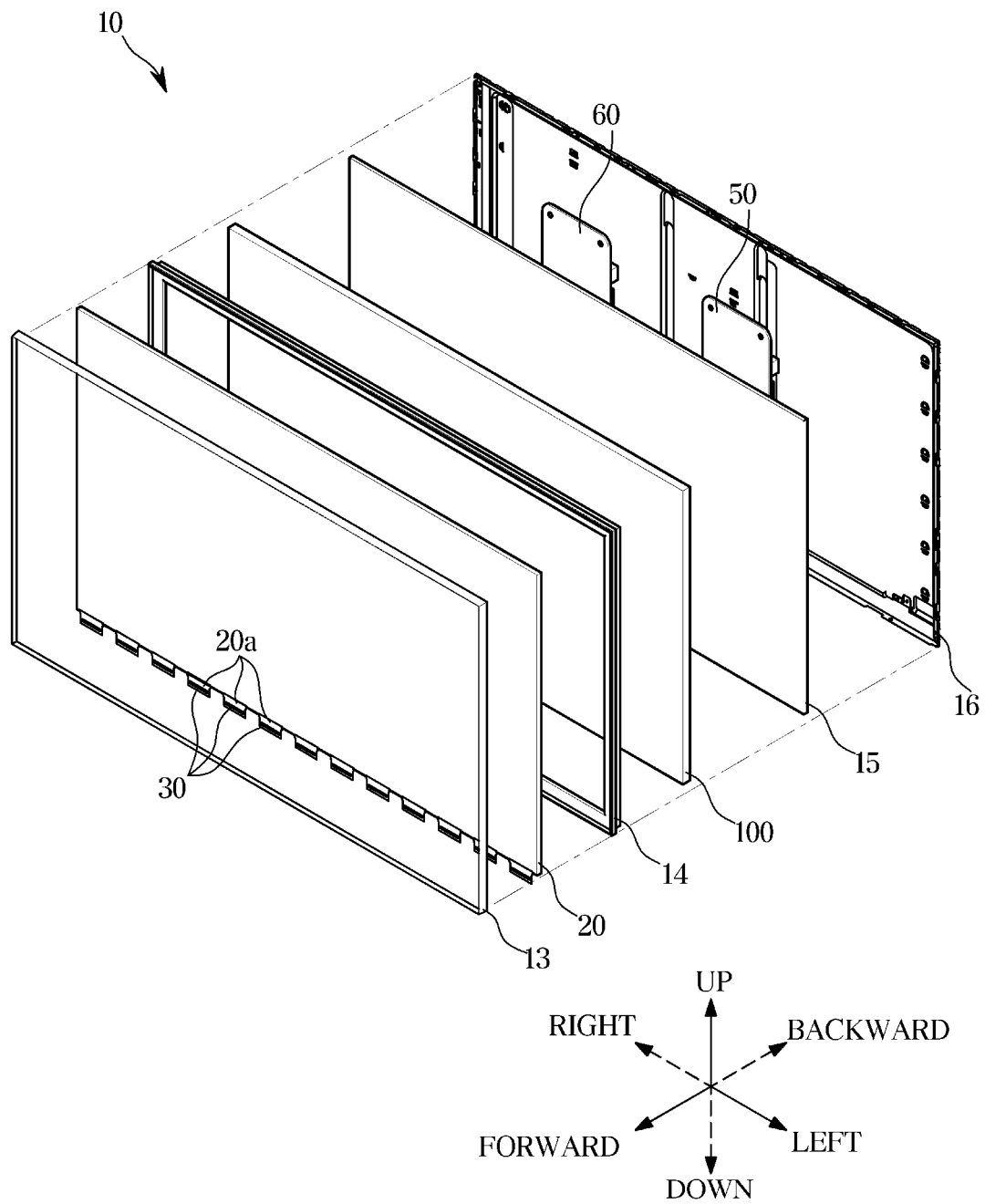
FIG. 2 is an exploded view of the display apparatus shown in FIG. 1 according to an embodiment.

FIG. 2 is an exploded view of the display apparatus shown in FIG. 1 according to an embodiment.

Referring to FIG. 2, many components to produce the image I on the screen S may be equipped in the main body 11. For example, a light source device 100, which is a surface light source, a liquid crystal panel 20 for blocking or passing the light emitted from the light source device 100, a control assembly 50 for controlling operations of the light source device 100 and the liquid crystal panel 20, and a power assembly 60 for supplying power to the light source device 100 and the liquid crystal panel 20 may be equipped in the main body 11. Furthermore, the main body 11 may include a bezel 13, a frame middle mold 14, a bottom chassis 15, and a rear cover 16 to support and secure the liquid crystal panel 20, the light source device 100, the control assembly 50, and the power assembly 60.

The light source device 100 may include a point light source for emitting monochromatic light or white light, and refract, reflect, and scatter the light emitted from the point light source to convert the light to uniform surface light. For example, the light source device 100 may include a plurality of light sources for emitting monochromatic light or white light, a diffuser plate for diffusing incident light from the plurality of light sources, a reflective sheet for reflecting light emitted from the plurality of light sources and the rear surface of the diffuser plate, and an optical sheet for refracting and scattering light emitted from the front surface of the diffuser plate. The light source device 100 may emit uniform surface light in a forward direction by refracting, reflecting and scattering the light emitted from the light source. The light source device 100 may be referred to as a backlight unit. A structure of the light source device 100 will now be described in more detail.

Figure 3:
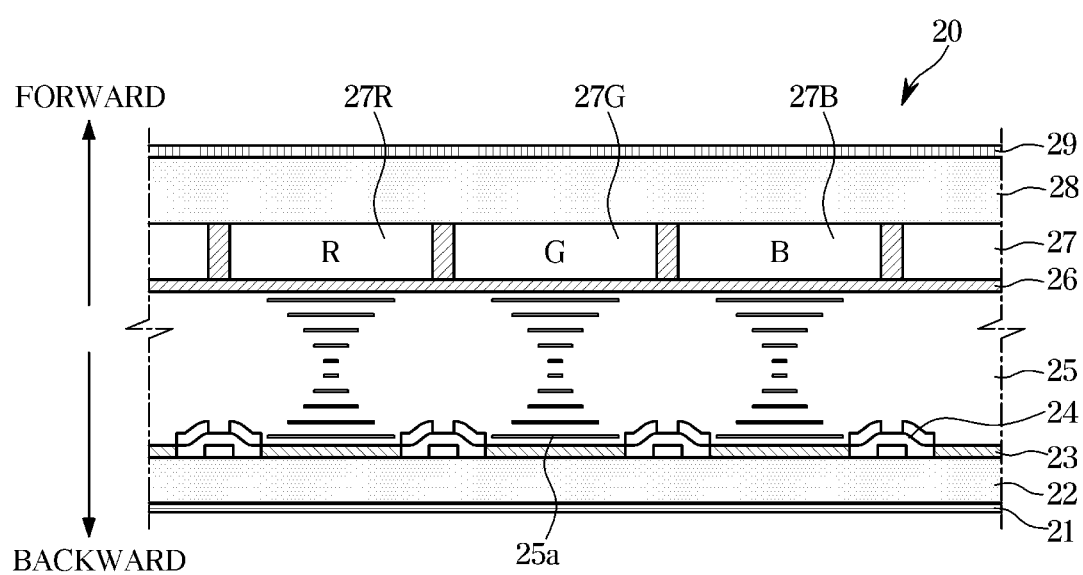
FIG. 3 is a cross-sectional view of a liquid crystal panel shown in FIG. 2 according to an embodiment.

FIG. 3 is a cross-sectional view of a liquid crystal panel shown in FIG. 2 according to an embodiment.

Referring to FIG. 3, the liquid crystal panel 20 is arranged in front of the light source device 100 for blocking or passing the light emitted from the light source device 100 to produce the image I. The front surface of the liquid crystal panel 20 may form the screen 12 of the display apparatus 10, and the liquid crystal panel 20 may include the plurality of pixels P. Each of the plurality of pixels P may block or pass the light emitted from the light source device 100 separately. The light that has passed through the plurality of pixels P may form the image I displayed on the screen 12.

The liquid crystal panel 20 may include a first polarizer film 21, a first transparent substrate 22, a pixel electrode 23, a thin film transistor (TFT) 24, a liquid crystal layer 25, a common electrode 26, a color filter 27, a second transparent substrate 28, and a second polarizer film 29.

The first transparent substrate 22 and the second transparent substrate 28 may securely support the pixel electrode 23, the TFT 24, the liquid crystal layer 25, the common electrode 26, and the color filter 27. The first and second transparent substrates 22 and 28 may be formed of tempered glass or transparent resin.

On the outer surfaces of the first and second transparent substrates 22 and 28, the first and second polarizer films 21 and 29 are applied, respectively. The first and second polarizer films 21 and 29 may each pass particular light while blocking the other light. For example, the first polarizer film 21 passes light having a magnetic field oscillating in a first direction while blocking the other light. The second polarizer film 29 passes light having a magnetic field oscillating in a second direction while blocking the other light. The first and second directions may be perpendicular to each other. In other words, a polarization direction of light passed by the first polarizer film 21 and an oscillation direction of light passed by the second polarizer film 29 are perpendicular to each other. As a result, light may not simultaneously pass both the first and second polarizer films 21 and 29.

The color filter 27 may be arranged on the inner side of the second transparent substrate 28. The color filter 27 may include a red color filter 27R for passing red light, a green color filter 27G for passing green light, and a blue color filter 27B for passing blue light. The red, green, and blue color filters 27R, 27G, and 27B may be arranged side by side. An area in which the color filter 27 is formed corresponds to the pixel P as described above. An area where the red color filter 27R is formed corresponds to the red subpixel PR, an area where the green color filter 27G is formed corresponds to the green subpixel PG, and an area where the blue color filter 27B is formed corresponds to the blue subpixel PB.

The pixel electrode 23 may be provided on the inner side of the first transparent substrate 22, and the common electrode 26 may be provided inside from the second transparent substrate 28. The pixel electrode 23 and the common electrode 26 are formed of an electrically conductive metal material, and may produce an electric field to change the layout of liquid crystal molecules 25a that form the liquid crystal layer 25, which will be described below.

The pixel electrode 23 and the common electrode 26 may be formed of a transparent material to pass the incident light from the outside. For example, the pixel electrode 23 and the common electrode 26 may be formed of such a material as indium tin oxide (ITO), indium zinc oxide (IZO), silver (Ag) nano wire, carbon nano tube (CNT), graphene, or 3,4-ethylenedioxythiophene (PEDOT).

The TFT 24 (or TFTs) is arranged inside the second transparent substrate 112. The TFT 24 may pass or block the current flowing to the pixel electrode 23. For example, depending on whether the TFT 24 is turned on (closed) or turned off (opened), an electric field may be formed or removed from between the pixel electrode 23 and the common electrode 26. The TFT 24 may be formed of poly-silicon, and formed using a semiconductor process, such as lithography, deposition, or ion implantation process.

The liquid crystal layer 25 is formed between the pixel electrode 23 and the common electrode 26, and filled with the liquid crystal molecules 25a. The liquid crystals are in an intermediate state between solid (crystal) and fluid. Most liquid crystal materials are organic compounds, the molecules of which are shaped like thin and long rods, and the arrangement of the molecules are irregular in a direction and regular in another direction. As a result, the liquid crystal has both fluidity of a liquid and optical anisotropy of a crystal (solid).

Furthermore, the liquid crystal reveals an optical property according to a change in electric field. For example, the liquid crystal may have varying directions of arrangement of molecules that form the liquid crystal, according to a change in electric field. When an electric field is produced in the liquid crystal layer 25, the liquid crystal molecules 25a of the liquid crystal layer 25 are arranged along the direction of the electric field, and otherwise when no electric field is produced in the liquid crystal layer 25, the liquid crystal molecules 25a may be arranged irregularly or arranged along the alignment layer. Consequently, the optical property of the liquid crystal layer 25 may be changed according to whether there is an electric field passing the liquid crystal layer 25.

Referring to FIGS. 2 and 3, one side of the liquid crystal panel 20 provided includes a cable 20a for transmitting image data to the liquid crystal panel 20 and a display driver integrated circuit (DDI) 30 (hereinafter, referred to as a 'driver IC') for processing digital image data to output an analog image signal.

The cable 20a may electrically connect the control assembly 50, the power assembly 60 and the driver IC 30. The cable 20a may also electrically connect the driver IC 30 and the liquid crystal panel 20. The cable 20a may include a flexible flat cable or a film cable, which is bendable.

The driver IC 30 may receive image data and power from the control assembly 50 and the power assembly 60 through the cable 20a, and transmit image data and driving current to the liquid crystal panel 20 through the cable 20a.

The cable 20a and the driver IC 30 may be integrally implemented as a film cable, a chip on film (COF), or a table carrier package (TCP). The driver IC 30 may be arranged on the cable 20b. It is not, however, limited thereto, and the driver IC 30 may be arranged on the liquid crystal panel 20 as well.

The control assembly 50 may include a control circuit for controlling operations of the liquid crystal panel 20 and the light source device 100. The control circuit may process image data received from an external content source, transmit image data to the liquid crystal panel 20, and transmit dimming data to the light source device 100.

The power assembly 60 may supply power to the liquid crystal panel 20 and the light source device 100. The light source device 100 may output surface light, and the liquid crystal panel 20 may block or pass the light emitted from the light source device 100.

The control assembly 50 and the power assembly 60 may be implemented with printed circuit boards (PCBs) and various circuits mounted on the PCBs. For example, the power circuit may include a power circuit board, and a capacitor, a coil, a resistor and a processor, which are mounted on the power circuit board. Furthermore, the control circuit may include a control circuit board with a memory and a processor mounted thereon.

The light source device 100 will now be described.

Figure 4:
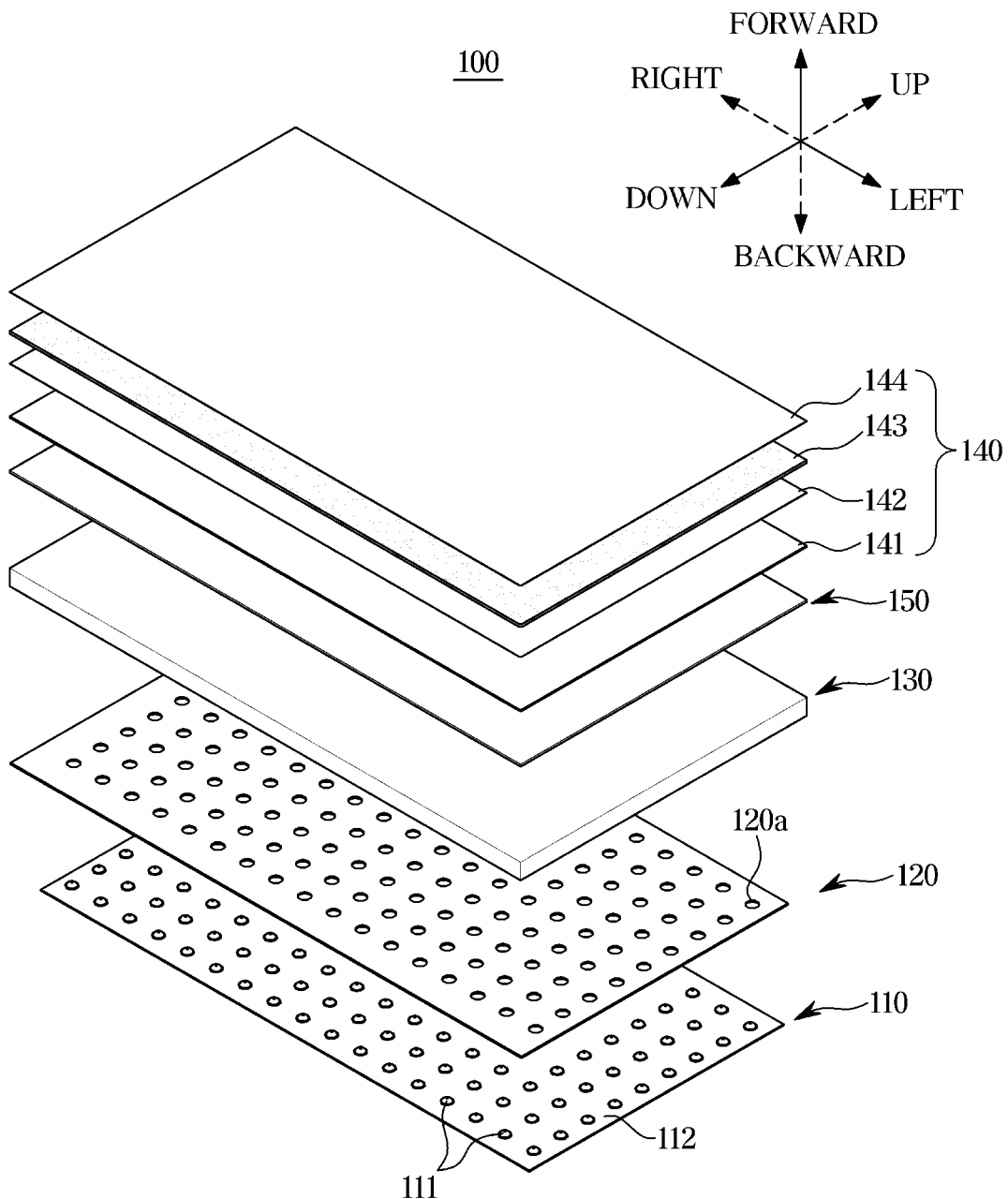
FIG. 4 is an exploded view of a light source device shown in FIG. 2 according to an embodiment.
Figure 5:
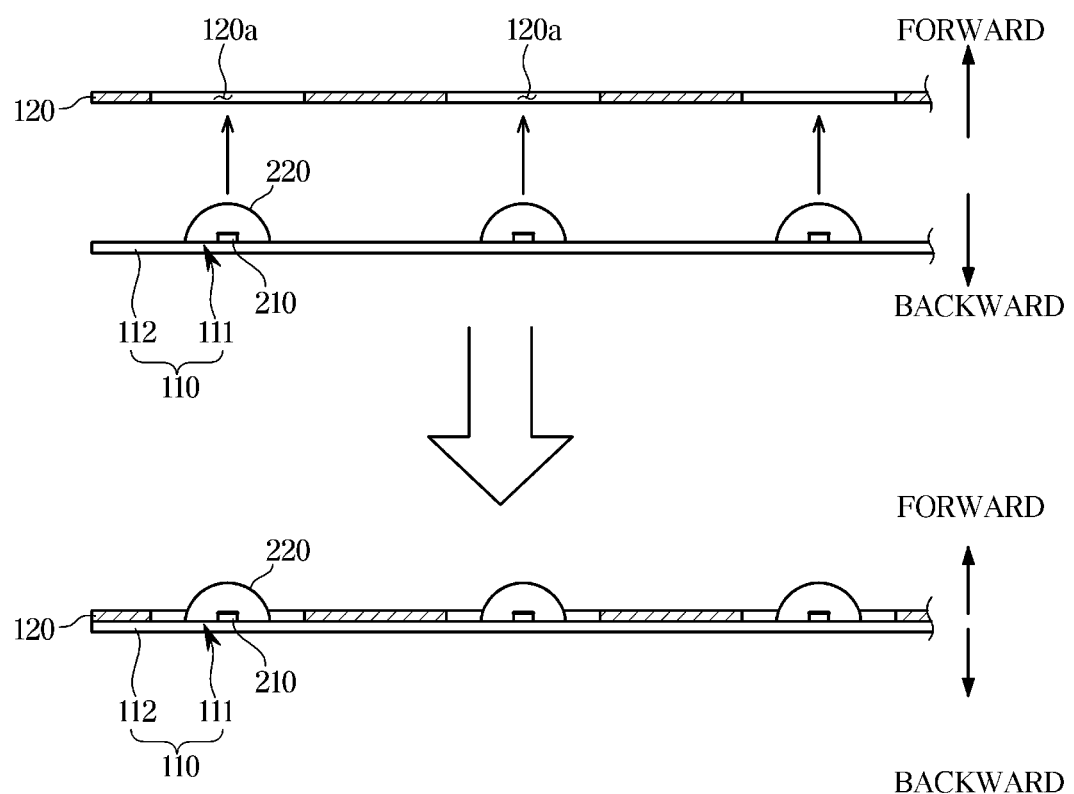
FIG. 5 is a diagram showing a combination between a light source module and a reflective sheet included in the light source device shown in FIG. 4 according to an embodiment.

FIG. 4 is an exploded view of a light source device shown in FIG. 2 according to an embodiment. FIG. 5 is a diagram showing a combination between a light source module and a reflective sheet included in the light source device shown in FIG. 4 according to an embodiment.

Referring to FIGS. 4 and 5, the light source device 100 includes a light source module 110 for producing light, a reflective sheet 120 for reflecting light, a diffuser plate 130 for uniformly diffusing light, an optical sheet 140 for enhancing brightness of output light, and a quantum dot sheet 150 for converting color of the light emitted from the light source module 110. The light source device 100 may be referred to as a backlight unit.

The light source module 110 may include a plurality of light sources 111 for emitting light, and a substrate 112 for supporting and fixing the plurality of light sources 111. The plurality of light sources 111 may be arranged in a predefined pattern to emit light with uniform brightness. The plurality of light sources 111 may be arranged such that a light source is equidistant from its neighboring light sources.

For example, the plurality of light sources 111 may be arranged in rows and columns. The plurality of light sources 111 may be arranged such that neighboring four light sources form almost a square. Distances between the neighboring light sources may be the same.

In another example, the plurality of light sources 111 may be arranged in multiple rows, and one light source 111 belonging to a row may be placed in the middle of two light sources belonging to neighboring two rows. Alternatively, the plurality of light sources may be arranged such that neighboring three light sources form almost a triangle. A light source is located to be adjacent to six other light sources, and the distances between the light source and the neighboring six light sources are almost the same.

The pattern in which the plurality of light sources 111 are arranged is not limited to the illustration, and the plurality of light sources 111 may be arranged in various other patterns.

The light source 111 may be provided as a device capable of emitting monochromatic light (light of a particular wavelength, e.g., blue light) when powered. For example, the light sources 111 may be provided as LEDs that emit blue light.

The substrate 112 may fix the plurality of light sources 111 to prevent the light sources 111 from being moved. The substrate 112 may supply power to the light sources 111. The substrate 112 may be formed of a synthetic resin, tapered glass or a PCB with conductive power supply lines formed therein.

The reflective sheet 120 includes a plurality of through holes 120a. The plurality of through holes 120a are formed in the reflective sheet 120 at positions matched to the plurality of light sources 111, respectively. Furthermore, the light sources 111 of the light source module 110 may pass through the through holes 120a and protrude forward from the reflective sheet 120. The light source 111 may be located within the through hole 120a. The through hole 120a may be shaped like a circle.

Referring to FIG. 5, the plurality of light sources 111 of the light source module 110 are inserted to the plurality of through holes 120a formed in the reflective sheet 120 during an assembly process of the reflective sheet 120 and the light source module 110. Hence, the substrate 112 of the light source module 110 is located behind the reflective sheet 120, and the plurality of light sources 111 of the light source module 110 may be exposed in the forward direction (as shown in the figure) from the reflective sheet 120.

The light sources 111 may emit light to various directions. The light emitted from the light source 111 may pass the diffuser plate 130, the quantum dot sheet 150 and the optical sheet 140. The light emitted from the light source 111 may be partially reflected from the diffuser plate 130, the quantum dot sheet 150 and/or the optical sheet 140.

The reflective sheet 120 may reflect the light reflected from the diffuser plate 130, the quantum dot sheet 150 and/or the optical sheet 140 back. The reflective sheet 120 may also reflect the light emitted from the light source 111. The light reflected from the reflective sheet 120 may enter the diffuser plate 130 again. Furthermore, the light reflected from the diffuser plate 130, the quantum dot sheet 150 and/or the optical sheet 140 may be reflected back off the surface of the substrate 112.

The diffuser plate 130 may be arranged in front of the reflective sheet 120 to uniformly diffuse the light emitted from the light sources 111 of the light source module 110. To avoid non-uniformity in brightness caused by the plurality of light sources 111, the diffuser plate 130 may diffuse the light emitted from the plurality of light sources 111 within the diffuser plate 130. Accordingly, the light emitted from the plurality of light sources 111 may be uniformly emitted forward.

The optical sheet 140 may include various sheets to enhance brightness and uniformity of the brightness. For example, the optical sheet 140 may include a diffuser sheet 141, a first prism sheet 142, a second prism sheet 143, and a reflective polarizer sheet 144.

The diffuser sheet 141 diffuses light for uniformity of brightness. Light emitted from the light sources 111 may be diffused by the diffuser plate 130 and may be further diffused by the diffuser sheet 141 included in the optical sheet 140.

The first and second prism sheets 142 and 143 may concentrate the light diffused by the diffuser sheet 141, thereby increasing brightness. The first and second prism sheets 142 and 143 may have triangular prism patterns, which are arranged next to each other to form a plurality of bands.

The reflective polarizer sheet 144 is a kind of polarizer film, which may transmit a portion of the incident light while reflecting the other portions to enhance brightness. For example, the reflective polarizer sheet 144 may pass light polarized in the same direction as a predetermined polarization direction of the reflective polarizer sheet 144 and reflect light polarized in a different direction than the predetermined polarization direction. Furthermore, the light reflected by the reflective polarizer sheet 144 may be recycled inside the light source device 100, and this recycling of light may enhance brightness of the display apparatus 10.

The optical sheet 140 may further include other various sheets or films in addition to the illustrated sheets or films.

The quantum dot sheet 150 may be arranged between the diffuser plate 130 and the optical sheet 140. Quantum dots, which are semiconductor crystals in nanometers (nm), may be distributed in the quantum dot sheet 150. The quantum dot may convert blue light to different colored light.

The smaller the quantum dot, the shorter wavelength of light may be emitted, and the larger the quantum dot, the longer wavelength of light may be emitted. For example, quantum dots having a diameter of 2 nm may emit blue light, and quantum dots having a diameter of about 10 nm may emit red light. When quantum dots of different sizes are used, the quantum dots may output light of various wavelengths spanning from red light to blue light.

The quantum dot sheet 150 allows for implementation of a high dynamic range (HDR) display due to a large difference between the brightest portion and the darkest portion of an image. Furthermore, the quantum dot sheet 150 may help improve color reproducibility and save power consumption.

Figure 6:
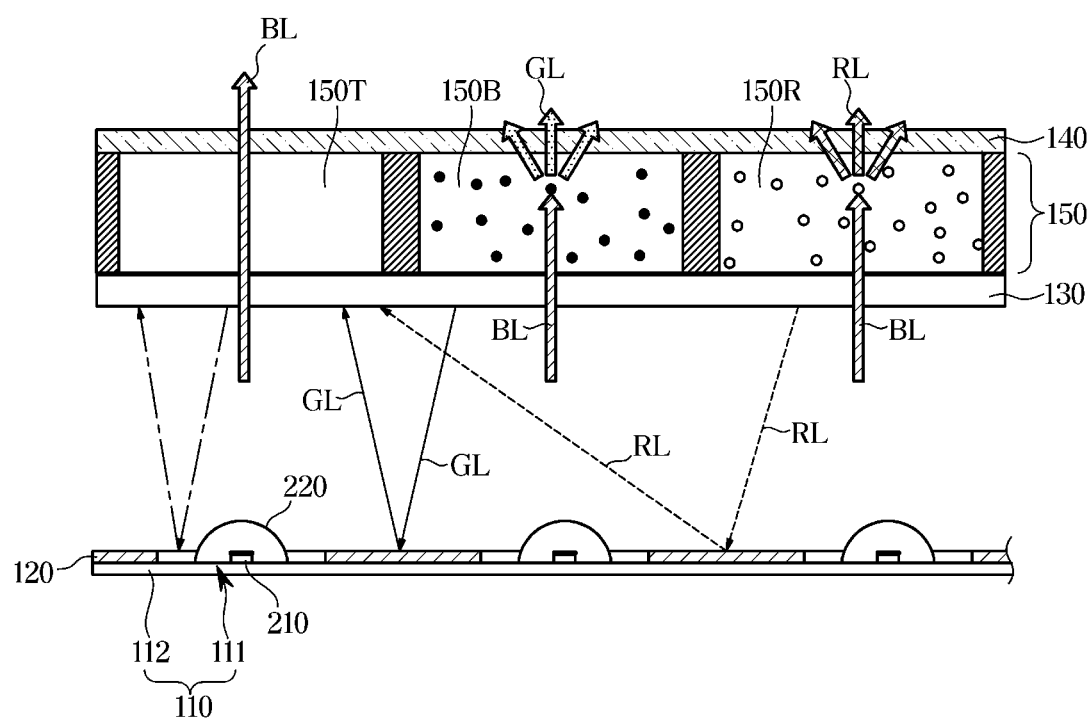
FIG. 6 is a cross-sectional view of a quantum dot sheet included in a light source device according to an embodiment.

FIG. 6 is a cross-sectional view of a quantum dot sheet included in a light source device according to an embodiment.

Referring to FIG. 6, the quantum dot sheet 150 may convert color of the light emitted from the light source 111. The quantum dot sheet 150 may include a red light converter 150R, a green light converter 150G and a light transmitter 150T. The red light converter 150R, the green light converter 150G and the light transmitter 150T may constitute one pixel. The converters and the transmitter may be arranged in different order than is illustrated.

The red light converter 150R and the green light converter 150G may each include quantum dots to convert the color of incident light. The light incident onto the quantum dot sheet 150 may be converted to red light RL by the red light converter 150R and green light GL by the green light converter 150G. Blue light BL is converted to the red light RL by the red light converter 150R and green light GL by the green light converter 150G.

The light incident onto the light transmitter 150T is transmitted without color conversion. The blue light BL incident onto the light transmitter 150T is transmitted without color conversion. The light transmitter 150T may be empty or may include a transparent resin such as acrylnitrile butadiene styrene (ABS), poly methyl methacrylate (PMMA), or poly carbonate such that incident light is transmitted as is.

The light transmitted through the quantum dot sheet 150 or color-converted by the quantum dot sheet 150 is incident onto the optical sheet 140 arranged in front of the quantum dot sheet 150.

To divide respective cells to define the red light converter 150R, the green light converter 150G and the light transmitter 150T, partition walls may be provided, which may be black matrices. The partition wall may block propagation of light between the cells, and enhance the contrast.

The light emitted from the light source 111 passes the diffuser plate 130, the quantum dot sheet 150 and the optical sheet 140. The light emitted from the light source 111 may be partially reflected from the diffuser plate 130, the quantum dot sheet 150 and/or the optical sheet 140. The reflective sheet 120 may reflect the light reflected from the diffuser plate 130, the quantum dot sheet 150 and/or the optical sheet 140 back. Furthermore, the light reflected from the diffuser plate 130, the quantum dot sheet 150 and/or the optical sheet 140 may be reflected back off the surface of the substrate 112.

A range of forward spreading of the blue light BL is generally determined by characteristics of the LED 210 (e.g., beam spread angle characteristics and optical characteristics). As the red light RL and the green light GL is emitted forward from the quantum dots, the range of forward spreading of the red light RL and the green light GL is relatively wider than the spread range of the blue light BL. Furthermore, the red light RL and the green light GL emitted toward the light source module 110 from the quantum dots may be reflected off the reflective sheet 120 and may enter into the light transmitter 150T, thereby being recycled. On the other hand, as the blue light BL is hardly recycled in other areas than the light transmitter 150T, the recycling range of the blue light BL is relatively narrow. Due to this, uniformity of the blue light BL may be relatively low than the uniformity of the red light RL and the uniformity of the green light GL.

The display apparatus 10 and light source device 100 as disclosed herein provides a diffuse reflection layer 270 that diffusely reflects the light emitted sideways from the LED 210 or the light reflected toward the light source module 110, to increase uniformity of the blue light. As the blue light may spread into a wider area through the diffuse reflection, an RGB color balance may be improved. A structure of the diffuse reflection layer 270 will now be described in detail.

Figure 7:
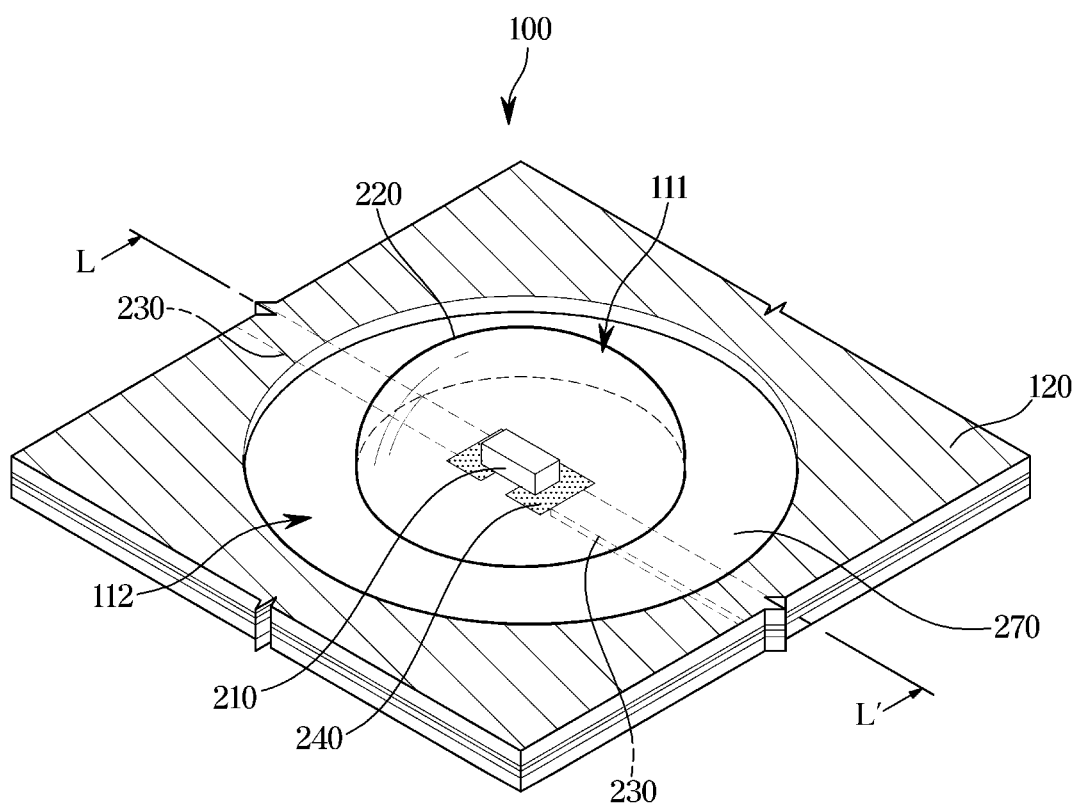
FIG. 7 is a diagram of a light source included in the light source module shown in FIG. 5 according to an embodiment.
Figure 8:
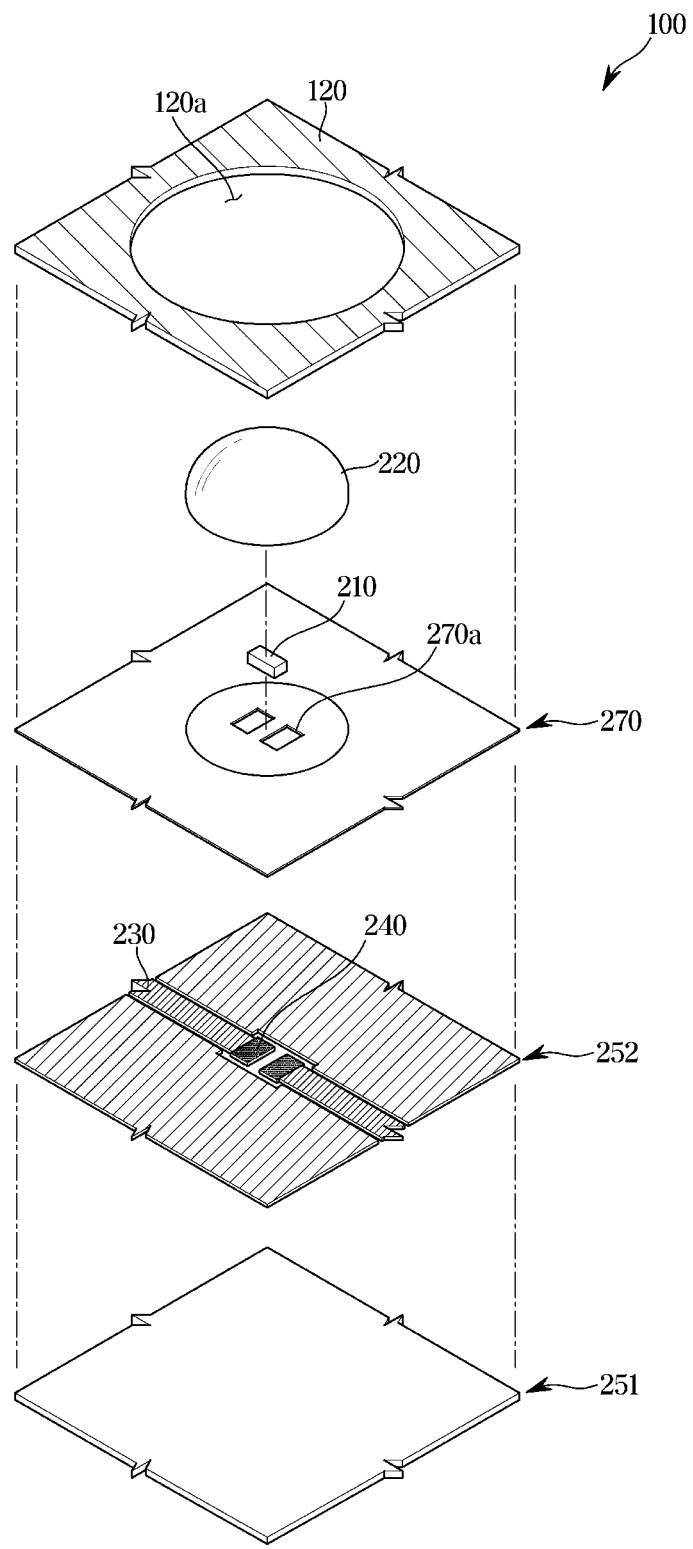
FIG. 8 is an exploded view of a light source module shown in FIG. 7 according to an embodiment.
Figure 9:
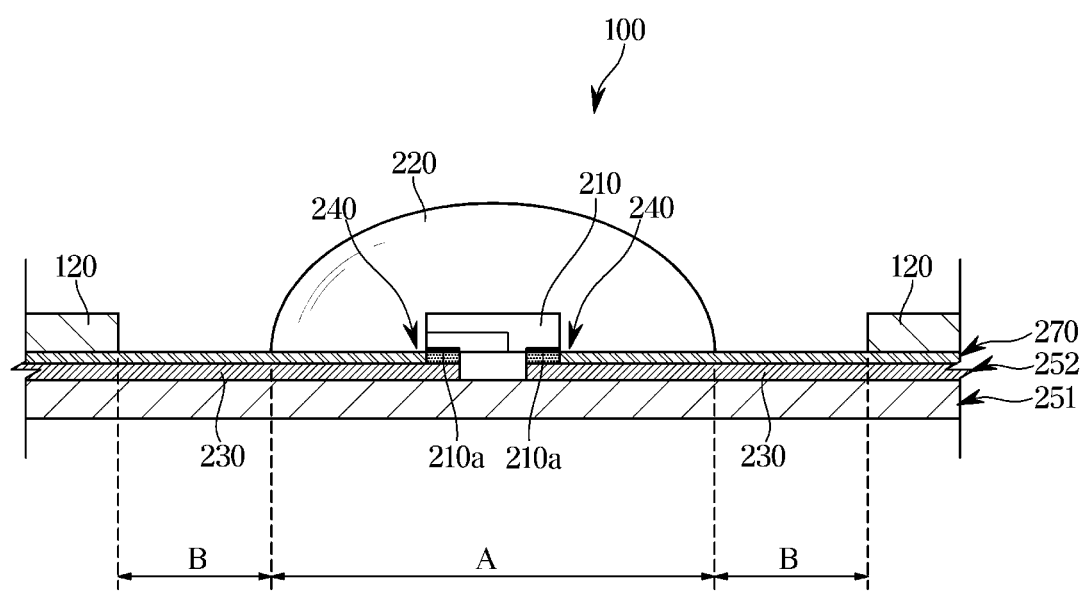
FIG. 9 is a cross-sectional view of the light source module taken along line L-L' shown in FIG. 7 according to an embodiment.

FIG. 7 is a diagram of a light source included in the light source module shown in FIG. 5 according to an embodiment. FIG. 8 is an exploded view of a light source module shown in FIG. 7 according to an embodiment. FIG. 9 is a cross-sectional view of the light source module taken along line L-L' shown in FIG. 7 according to an embodiment.

Referring to FIGS. 7, 8 and 9, the light source 111 of the light source module 110 may pass through the through hole 120a of the reflective sheet 120 and protrude forward from the reflective sheet 120. The light source 111 and part of the substrate 112 may be exposed in the forward direction shown in the figure from the reflective sheet 120 through the through hole 120a. The light source 111 may include an electrical/mechanical structure located in an area defined by the through hole 120a of the reflective sheet 120. The light source 111 may include the LED 210 and an optical dome 220.

The LED 210 may include a p-type semiconductor and an n-type semiconductor to emit light based on recombination between holes and electrons. Furthermore, the LED 210 is equipped with a pair of electrodes 210a to apply holes and electrons to the p-type semiconductor and the n-type semiconductor, respectively. The LED 210 may convert electric energy to light energy. In other words, the LED 210 may emit light having the highest intensity at a predefined wavelength at which power is supplied. For example, the LED 210 may emit blue light having a peak value at a wavelength that represents blue color (e.g., a wavelength between 450 nm and 495 nm).

The LED 210 may be attached directly to the substrate 112 in a method of chip on board (COB). In other words, the light source 111 may include the LED 210 with an LED chip or an LED die attached directly to the substrate 112 without extra packaging. To make the light source 111 compact, the light source module 110 with the LED 210 of the flip chip type attached to the substrate 112 in the COB method may be manufactured.

A power feed line 230 and a power feed pad 240 are arranged on the substrate 112 to supply power to the LED 210 of the flip chip type. The power feed line 230 is arranged on the substrate 112 to supply an electrical signal and/or power from the control assembly 50 and/or the power assembly 60 to the LED 210.

The substrate 112 may be formed by alternately stacking a non-conductive insulation layer 251 and a conductive layer 252. The conductive layer 252 may be arranged between the insulation layer 251 and the diffuse reflection layer 270.

A line or pattern in which power and/or electrical signals pass is formed on the conductive layer 252. The conductive layer 252 may be formed of various electrically conductive materials. For example, the conductive layer 252 may be formed of various metal substances such as copper (Cu), tin (Sn), aluminum (Al) or an alloy thereof.

A dielectric of the insulation layer 251 may insulate gaps between lines or patterns of the conductive layer 252. The insulation layer 251 may be formed of a dielectric (e.g., FR-4) for electrical insulation.

The power feed line 230 may be implemented by a line or pattern formed on the conductive layer 252. The power feed line 230 may be electrically connected to the LED 210 through the power feed pad 240. The power feed pad 240 may be formed by exposing the power feed line 230 to the outside.

The diffuse reflection layer 270 may be arranged in front of the conductive layer 252. The diffuse reflection layer 270 may be arranged in the forefront of the substrate 112. The diffuse reflection layer 270 may diffusely reflect light (blue light) emitted sideways from the LED 210. The diffuse reflection layer 270 may diffusely reflect the light reflected from the diffuser plate 130, the quantum dot sheet 150 and/or the optical sheet 140.

Furthermore, the diffuse reflection layer 270 may prevent the substrate 112 from being damaged by external shock, chemical action and/or optical action. The diffuse reflection layer 270 may cover the power feed line 230 to block the power feed line 230 from being exposed to the outside.

For electrical contact between the power feed line 230 and the LED 210, a window 270a may be formed on the diffuse reflection layer 270 to expose a portion of the power feed line 230 to the outside. A portion of the power feed line 230 exposed through the window 270a of the diffuse reflection layer 270 may form the power feed pad 240. The power feed pad 240 and the LED 210 may make electrical contact through the window 270a.

A conductive adhesive material is applied onto the power feed pad 240 for electrical contact between the power feed line 230 exposed to the outside and the electrode 210a of the LED 210. The conductive adhesive material may be applied within the window 270a of the diffuse reflection layer 270. The electrode 210a of the LED 210 may be electrically connected to the power feed line 230 through the conductive adhesive material. The conductive adhesive material may include electrically conductive solder. The conductive adhesive material is not limited thereto, and the conductive adhesive material may include an electrically conductive epoxy adhesive.

Power may be supplied to the LED 210 through the power feed line 230 and the power feed pad 240, and the LED 210 may emit light when powered. One pair of power feed pads 240 may be provided to correspond to the pair of electrodes 210a, respectively, equipped in the LED 210 of the flip chip type.

The optical dome 220 may cover the LED 210. The optical dome 220 may prevent or suppress damage to the LED 210 due to an external mechanical action and/or chemical action. The optical dome 220 may be provided to be separated from the reflective sheet 120.

The optical dome 220 may be shaped like a dome obtained by cutting a sphere without including the center or a semi-sphere obtained by cutting the sphere with the center included. A vertical cross-section of the optical dome 220 may have an arcuate form or a semi-circular form.

The optical dome 220 may be formed of silicon or epoxy resin. For example, melted silicon or epoxy resin is discharged onto the LED 210 through, for example, a nozzle, and then hardened to form the optical dome 220.

Depending on viscosity of the fluid silicon or epoxy resin, the shape of the optical dome 220 may be variously changed. For example, when the optical dome 220 is manufactured with silicon with a thixotropic index of about 2.7 to 3.3 (e.g., about 3.0), the optical dome 220 having a dome ratio of about 0.25 to 0.31 (e.g., about 0.28) representing a ratio of dome height to a diameter of the bottom side of the dome (i.e., dome height/diameter of bottom side) may be formed. For example, the optical dome 220 manufactured with the silicon having the thixotropic index of about 2.7 to 3.3 (e.g., about 3.0) may have a diameter of the bottom side of about 2.5 mm and height of about 0.7 mm.

The optical dome 220 may be optically transparent or translucent. Light emitted from the LED 210 may pass through the optical dome 220 to the outside. The dome-shaped optical dome 220 may refract light like a lens. For example, the light emitted from the LED 210 may be refracted and dispersed by the optical dome 220. As such, the optical dome 220 may not only protect the LED 210 from an external mechanical action and/or chemical action or electrical action, but also scatter the light emitted from the LED 210.

Figure 10:
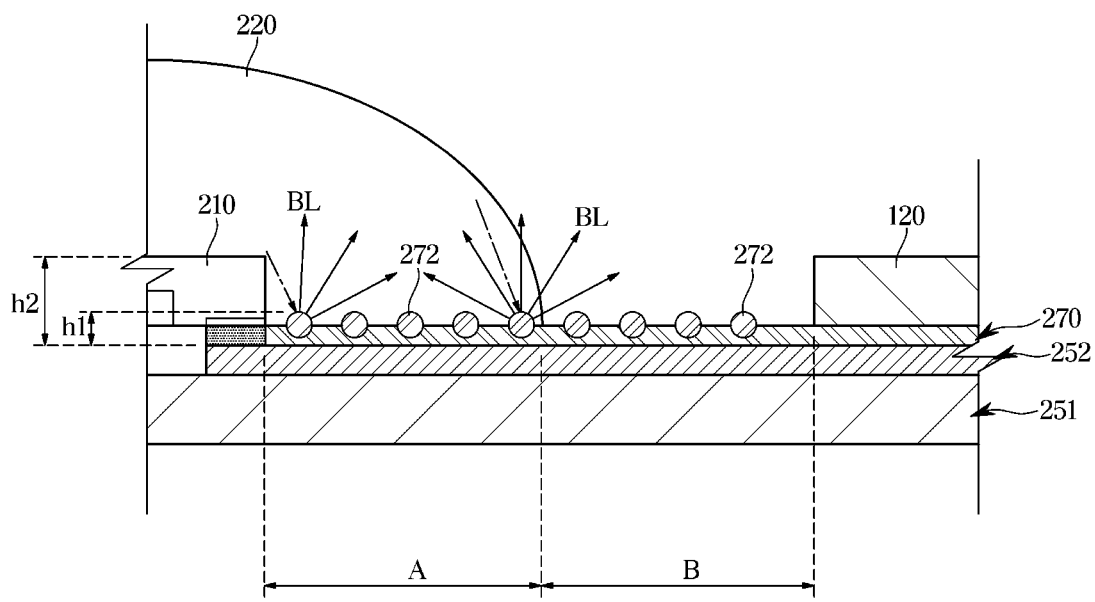
FIG. 10 is a diagram of an example of a diffuse reflection layer shown in FIG. 9 according to an embodiment.
Figure 11:
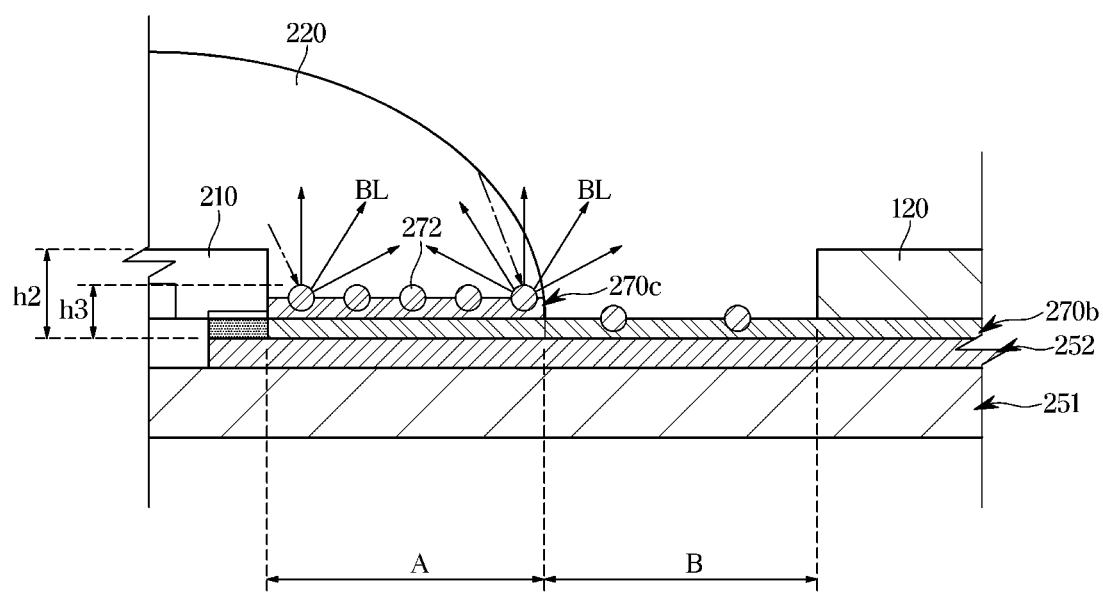
FIG. 11 is a diagram of an example of the diffuse reflection layer shown in FIG. 9 according to an embodiment.

FIG. 10 is a diagram of an example of a diffuse reflection layer shown in FIG. 9 according to an embodiment. FIG. 11 is a diagram of an example of the diffuse reflection layer shown in FIG. 9 according to an embodiment.

Referring to FIGS. 10 and 11, the substrate 112 is exposed in the forward direction (as shown in the figure) through the through hole 120a of the reflective sheet 120, and includes the diffuse reflection layer 270 that diffusely reflects the light emitted from the light source 111 and the light reflected from the quantum dot sheet 150. The diffuse reflection layer 270 is arranged in the forefront of the substrate 112.

To diffusely reflect the light, the diffuse reflection layer 270 may include bumps 272. The bumps 272 may be formed in at least a partial area of the diffuse reflection layer 270 exposed in the forward direction (as shown in the figure) through the through hole 120a. In other words, at least a portion of the front surface of the diffuse reflection layer 270 is not smooth but may be unevenly or roughly formed. By causing diffuse reflection of the blue light BL in an area between the LED 210 and the reflective sheet 120, the spread range of the blue light BL may increase. Accordingly, uniformity of the blue light BL may be enhanced.

The bumps 272 may be formed in a first area A of the diffuse reflection layer 270 located inside the optical dome 220. The size of the first area A may be defined by the optical dome 220. In other words, the first area A may be defined according to the circumference of the optical dome 220 that contacts the diffuse reflection layer 270.

Furthermore, the bumps 272 may also be formed in a second area B of the diffuse reflection layer 270 located between the optical dome 220 and the reflective sheet 120. A density of the bumps 272 arranged on the diffuse reflection layer 270 may vary depending on the design. For example, a first density of the bumps 272 in the first area A may be equal to a second density of the bumps 72 in the second area B. The bumps 272 may not be formed between the windows 270a of the diffuse reflection layer.

In another example, the first density of the bumps 272 in the first area A (i.e., an amount of bumps in the first area A) may be higher than the second density of the bumps 72 in the second area B (i.e., an amount of bumps in the second area B). In other words, more of the bumps 272 may be formed in the first area A. The bumps 272 may not be formed in the second area B. By increasing the density of the bumps 272 in the first area A, more diffuse reflection may occur for the light emitted sideways from the LED 210. More diffuse reflection occurring in an area adjacent to the LED 210 may cause an increase in light spread.

A first height h1 of the bump 272 that protrudes from the rear surface of the diffuse reflection layer 270 (e.g., protruding forward based on the rear surface of the diffuse reflection layer 270) may be lower than a second height h2 of the LED 210. By forming the height of the bump 272 to be relatively low, optimal diffuse reflection of the light emitted sideways from the LED 210 may occur. Furthermore, the first height h1 of the bump 272 is lower than the height of the reflective sheet 120.

Although the protruding part of the bump 272 is shown as being shaped like a semi-sphere, the bump 272 may be provided in other different shapes that may cause diffuse reflection of light. For example, the bump 272 may have the form of a semi-sphere, a cone, a triangular pyramid or a quadrangular pyramid.

The diffuse reflection layer 270 may be formed by using various manufacturing processes. For example, the diffuse reflection layer 270 may be formed in ink containing a plurality of beads and applied onto the conductive layer 252 of the substrate 112. In other words, the diffuse reflection layer 270 may be formed by applying ink containing the beads onto the conductive layer 252. The beads may form the bumps 272 on the front surface of the diffuse reflection layer 270. In another example, the diffuse reflection layer 270 may be formed by printing a bump pattern on a cover layer arranged on the conductive layer 252 of the substrate 112. The printed bump pattern may form the bumps 272 on the front surface of the diffuse reflection layer 270.

Referring to FIG. 11, the diffuse reflection layer 270 may include a plurality of layers 270b and 270c. The first diffuse reflection layer 270b may be arranged first on the conductive layer 252, and the second diffuse reflection layer 270c may be arranged in the first area A located within the optical dome 220. An area of the second diffuse reflection layer 270c may correspond to the size of the first area A. As the second diffuse reflection layer 270c is arranged on the first diffuse reflection layer 270b, the first diffuse reflection layer 270b may be exposed in the forward direction shown in the figure in the second area B between the optical dome 220 and the reflective sheet 120.

The first density of the bumps 272 included in the second diffuse reflection layer 270c (i.e., an amount of bumps included in the second diffuse reflection layer 270c) may be higher than the second density of the bumps 272 included in the first diffuse reflection layer 270b (i.e., an amount of bumps included in the first diffuse reflection layer 270b). By sequentially arranging the first diffuse reflection layer 270b and the second diffuse reflection layer 270c having bumps of different densities, the diffuse reflection layer 270 including a plurality of areas having different diffuse reflection ratios may be easily formed.

In FIG. 11, a third height h3 of the bump 272 protruding forward from the second diffuse reflection layer 270c based on the rear surface of the first diffuse reflection layer 270b may be lower than the second height h2 of the LED 210. Furthermore, the third height h3 of the bump 272 is lower than the height of the reflective sheet 120.

Figure 12:
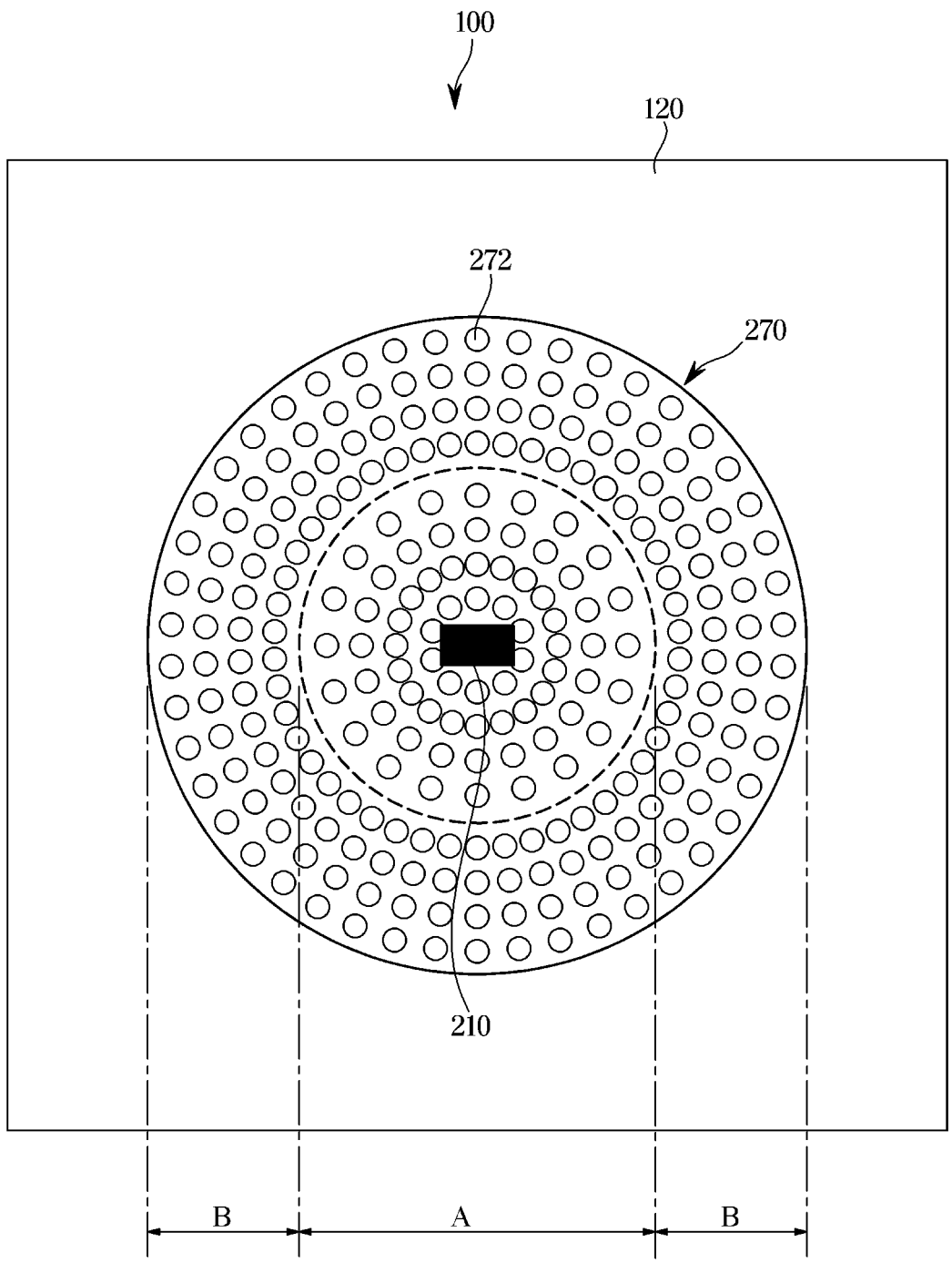
FIG. 12 is a diagram of the light source module shown in FIG. 10 viewed from the front according to an embodiment.
Figure 13:
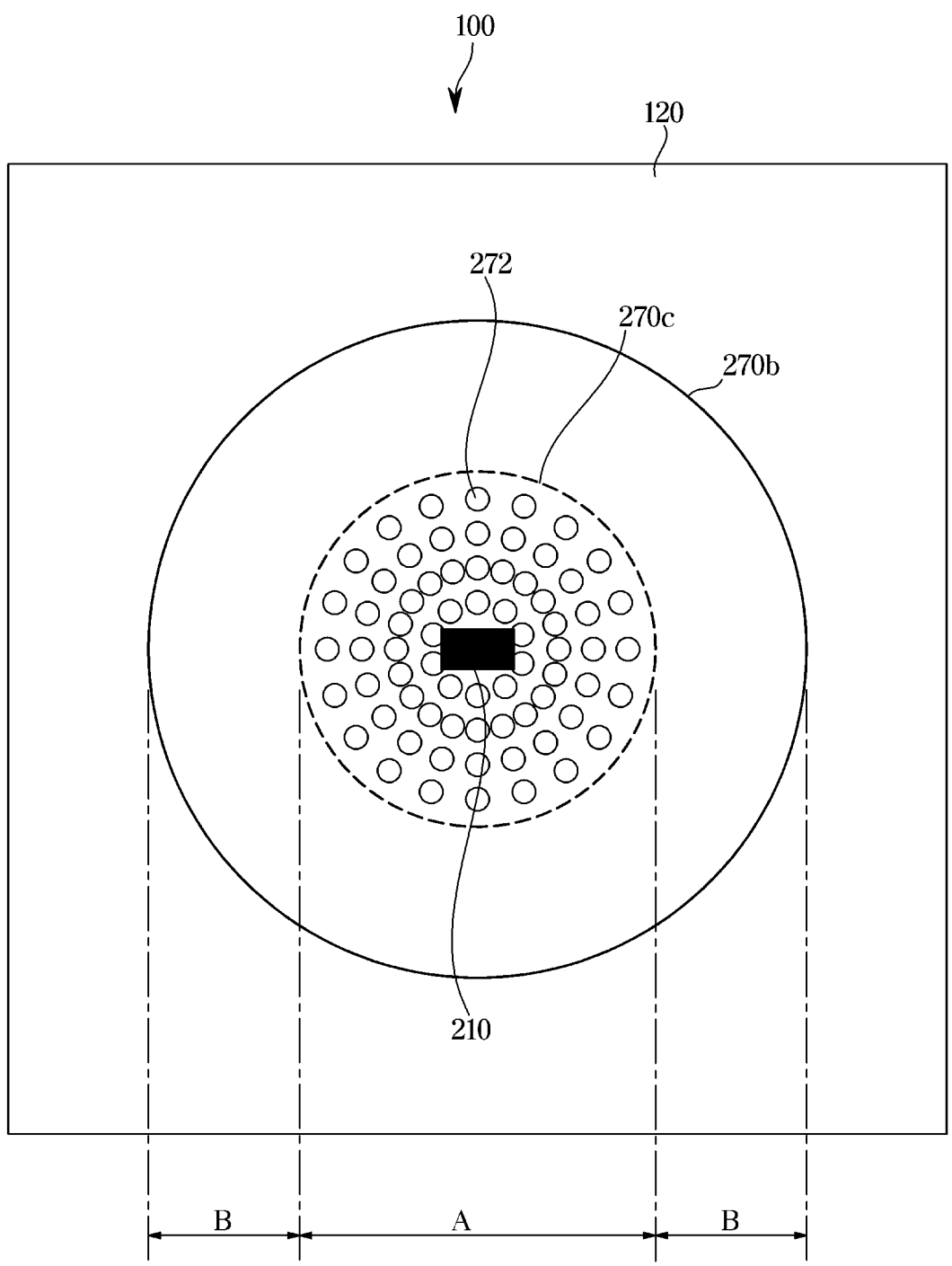
FIG. 13 is a diagram of the light source module shown in FIG. 11 viewed from the front according to an embodiment.

FIG. 12 is a diagram of the light source module shown in FIG. 10 viewed from the front according to an embodiment. FIG. 13 is a diagram of the light source module shown in FIG. 11 viewed from the front according to an embodiment.

Referring to FIG. 12, the diffuse reflection layer 270 of the substrate 112 is exposed in the forward direction shown in the figure through the through hole 120a of the reflective sheet 120. The bumps 272 may be formed on the front surface of the forwardly exposed diffuse reflection layer 270. In other words, the front surface of the diffuse reflection layer 270 is not smooth but may be unevenly or roughly formed. The bumps 272 may be formed in both the first area A of the diffuse reflection layer 270 located inside the optical dome 220 and the second area B of the diffuser reflection layer 270 located between the optical dome 220 and the reflective sheet 120. In FIG. 12, the first density of the bumps 272 in the first area A and the second density of the bumps 272 in the second area B are illustrated as being the same.

Referring to FIG. 13, the first density of the bumps 272 in the first area A may be higher than the second density of the bumps 72 in the second area B. In other words, more of the bumps 272 may be formed in the first area A. The bumps 272 may not be formed in the second area B of the diffuse reflection layer 270. Furthermore, to form the diffuse reflection layer 270 including a plurality of areas having different reflection ratios, the first diffuse reflection layer 270b may be arranged first on the conductive layer 252 and the second diffuse reflection layer 270c may be arranged in the first area A. The first diffuse reflection layer 270b may be exposed in the forward direction shown in the figure in the second area B between the optical dome 220 and the reflective sheet 120.

According to the disclosure, a display apparatus and light source device may include a diffuse reflection layer which scatters light emitted sideways from an LED or light reflected toward a light source module, thereby enhancing uniformity of blue light. As the blue light may spread into a wider area through the diffuse reflection of the blue light, an RGB color balance may be improved.

The embodiments of the disclosure disclosed in the specification and the drawings provide merely specific examples to easily describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. A light source device comprising:
   a substrate;
   a reflective sheet provided on the substrate and having a through hole;
   a light source provided on the substrate, and exposed through the through hole of the reflective sheet, the light source comprising a light emitting diode (LED);
   an optical dome at least partially covering the LED; and
   a quantum dot sheet configured to convert a color of light emitted by the light source,
   wherein the substrate comprises a diffuse reflection layer exposed through the through hole of the reflective sheet and configured to diffusely reflect the light emitted by the light source and light reflected from the quantum dot sheet,
   wherein the optical dome is provided on the diffuse reflection layer such that the diffuse reflection layer has a first area located within the optical dome and a second area located outside of the optical dome and exposed through the through hole, and
   wherein the diffuse reflection layer comprises at least one first bump provided in the first area located within the optical dome and protruding from a surface of the diffuse reflection layer.

2. The light source device of claim 1, wherein the diffuse reflection layer comprises at least one second bump in the second area of the diffuse reflection layer.

3. The light source device of claim 2, wherein the optical dome is provided at a distance from the reflective sheet.

4. The light source device of claim 3, wherein the second area of the diffuse reflection layer is located between the optical dome and the reflective sheet.

5. The light source device of claim 4, wherein a first amount of the at least one first bump in the first area is higher than a second amount of the at least one second bump in the second area.

6. The light source device of claim 1, wherein the at least one first bump protrudes from a rear surface of the diffuse reflection layer at a first height that is lower than a second height of the LED.

7. The light source device of claim 1, wherein the at least one first bump has a shape of a semi-sphere, a cone, a triangular pyramid or a quadrangular pyramid.

8. The light source device of claim 1, wherein the diffuse reflection layer is formed by ink comprising a plurality of beads and applied on a conductive layer of the substrate.

9. The light source device of claim 1, wherein the diffuse reflection layer comprises:
   a cover layer provided on a conductive layer of the substrate; and
   a bump pattern provided on the cover layer.

10. A display apparatus comprising:
    a liquid crystal panel; and
    a light source device configured to emit light to the liquid crystal panel,
    wherein the light source device comprises:
      a substrate;
      a reflective sheet provided on the substrate and having a through hole;
      a light source provided on the substrate, and exposed through the through hole of the reflective sheet, the light source comprising a light emitting diode (LED);
      an optical dome at least partially covering the LED; and
      a quantum dot sheet configured to convert a color of light emitted from the light source,
    wherein the substrate comprises a diffuse reflection layer exposed forward through the through hole of the reflective sheet and configured to diffusely reflect the light emitted from the light source and light reflected from the quantum dot sheet,
    wherein the optical dome is provided on the diffuse reflection layer such that the diffuse reflection layer has a first area located within the optical dome and a second area located outside of the optical dome and exposed through the through hole, and
    wherein the diffuse reflection layer comprises at least one first bump provided in the first area located within the optical dome and protruding from a surface of the diffuse reflection layer.

11. The display apparatus of claim 10, wherein the diffuse reflection layer comprises at least one second bump in the second area of the diffuse reflection layer.

12. The display apparatus of claim 11, wherein the optical dome is provided at a distance from the reflective sheet.

13. The display apparatus of claim 12, wherein the second area of the diffuse reflection layer is located between the optical dome and the reflective sheet.

14. The display apparatus of claim 13, wherein a first amount of the at least one first bump in the first area is higher than a second amount of the at least one second bump in the second area.

15. The display apparatus of claim 10, wherein the at least one first bump protrudes from a rear surface of the diffuse reflection layer at a first height that is lower than a second height of the LED.

16. The display apparatus of claim 10, wherein the at least one first bump has a shape of a semi-sphere, a cone, a triangular pyramid or a quadrangular pyramid.

17. The display apparatus of claim 10, wherein the diffuse reflection layer is formed by ink comprising a plurality of beads and applied on a conductive layer of the substrate.

18. The display apparatus of claim 10, wherein the diffuse reflection layer comprises:
- a cover layer provided on a conductive layer of the substrate; and
- a bump pattern provided on the cover layer.

19. A light source device, comprising:
- a substrate comprising a diffuse reflection layer;
- a reflective sheet provided on the substrate and having a through hole;
- a light source at least partially exposed through the through hole of the reflective sheet;
- an optical dome at least partially covering the LED; and
- a quantum dot sheet configured to convert a color of light emitted from the light source, wherein the optical dome is provided on the diffuse reflection layer such that the diffuse reflection layer comprises a first area at least partially exposed through the through hole of the reflective sheet and a second area located within the optical dome, wherein the diffuse reflection layer comprises at least one first bump in the first area of the diffuse reflection layer that is at least partially exposed through the through hole of the reflective sheet, and wherein the diffuse reflection layer comprises at least one second bump in the second area of the diffuse reflection layer that is located within the optical dome, the at least one second bump protruding from a surface of the diffuse reflection layer.

20. The light source device of claim 19, wherein the second area of the diffuse reflection layer is located between the optical dome and the reflective sheet.

\* \* \* \* \*